(12) United States Patent
Favaretto (10) Patent No.: US 8,424,912 B2
(45) Date of Patent: Apr. 23, 2013

(54) COMPOSITE BAR FOR THE CHASSIS OF A VEHICLE

(75) Inventor: Fabrizio Favaretto, Formigine (IT)

(73) Assignee: Ferrari S.p.A. (IT)

( * ) Notice: Subject to any disclaimer, the term of this patent is extended or adjusted under 35 U.S.C. 154(b) by 174 days.

(21) Appl. No.: 13/007,857

(22) Filed: Jan. 17, 2011

(65) Prior Publication Data

US 2011/0175337 A1    Jul. 21, 2011

(30) Foreign Application Priority Data

Jan. 18, 2010   (IT) .............................. BO2010A0024

(51) Int. Cl.
*B62D 21/12* (2006.01)

(52) U.S. Cl.
USPC ........ 280/781; 280/785; 29/463; 296/193.03; 296/193.04; 296/205

(58) Field of Classification Search ............. 296/193.03, 296/193.04, 205, 29; 280/781, 785; 29/453, 29/463
See application file for complete search history.

(56) References Cited

U.S. PATENT DOCUMENTS

| | | | | | |
|---|---|---|---|---|---|
| 2,708,786 | A | * | 5/1955 | Watson .......... 228/155 |
| 3,420,032 | A | * | 1/1969 | Felt ................ 52/844 |
| 3,923,337 | A | * | 12/1975 | Kershaw et al. ...... 296/183.2 |
| 4,386,792 | A | * | 6/1983 | Moore et al. .......... 280/781 |
| 5,332,281 | A | * | 7/1994 | Janotik et al. ........ 296/209 |
| 5,375,314 | A | | 12/1994 | Bora |
| 5,442,885 | A | * | 8/1995 | Laven et al. .......... 52/844 |
| 5,741,026 | A | * | 4/1998 | Bonnville ............. 280/781 |
| 5,823,569 | A | * | 10/1998 | Scott .................. 280/781 |
| 5,829,219 | A | * | 11/1998 | Sugawara et al. ........ 52/653.2 |
| 5,855,394 | A | * | 1/1999 | Horton et al. ........ 280/781 |
| 6,003,898 | A | * | 12/1999 | Teply et al. .......... 280/785 |
| 6,010,155 | A | * | 1/2000 | Rinehart .............. 280/781 |
| 6,099,039 | A | * | 8/2000 | Hine .................. 280/781 |
| 6,099,194 | A | * | 8/2000 | Durand ............... 403/270 |
| 6,123,378 | A | * | 9/2000 | Teply et al. .......... 296/29 |
| 6,315,325 | B1 | * | 11/2001 | Dunn ................. 280/755 |
| 6,416,119 | B1 | | 7/2002 | Gericke et al. |
| 6,523,246 | B1 | * | 2/2003 | Matsui et al. ......... 29/559 |
| 7,100,261 | B2 | * | 9/2006 | Gulati ................ 29/463 |

(Continued)

FOREIGN PATENT DOCUMENTS

DE    3811427 A1    10/1989
DE    3811427 A1 *  10/1989

(Continued)

OTHER PUBLICATIONS

"Italian Application Serial No. IT B020100024, Search Report dated Sep. 7, 2010", 2 pgs.

*Primary Examiner* — Nicole Verley (74) *Attorney, Agent, or Firm* — Schwegman Lundberg & Woessner, P.A.

(57) ABSTRACT

A composite bar for the chassis of a vehicle; the composite bar consists of at least two extruded elements which are internally hollow and are butt jointed at a junction area; each extruded element has a trapezoidal cross section having a major base, a minor base parallel and opposite to the major base, and two side walls; a first end of a first extruded element arranged in the junction area has no major base; and a second end of a second extruded element arranged in the junction area is interference fitted into the first end through the missing major base.

20 Claims, 8 Drawing Sheets

U.S. PATENT DOCUMENTS

| | | | |
|---|---|---|---|
| 7,121,586 B2* | 10/2006 | McNally | 280/797 |
| 7,251,915 B2* | 8/2007 | Zimmerman et al. | 52/239 |
| 7,350,818 B2* | 4/2008 | Rini et al. | 280/781 |
| 7,458,602 B2* | 12/2008 | Maxwell | 280/656 |
| 7,618,063 B2* | 11/2009 | Takeshima et al. | 280/785 |
| 7,857,349 B2* | 12/2010 | Fujiki et al. | 280/785 |
| 7,942,447 B2* | 5/2011 | Davis et al. | 280/783 |
| 8,109,561 B2* | 2/2012 | Matsumura | 296/193.05 |
| 8,163,116 B2* | 4/2012 | Riley | 156/79 |
| 8,220,865 B2* | 7/2012 | Brunner | 296/187.1 |
| 2004/0232686 A1* | 11/2004 | Locke | 280/781 |
| 2005/0035586 A1* | 2/2005 | Martin et al. | 280/781 |
| 2005/0196228 A1 | 9/2005 | Bruggemann et al. | |
| 2007/0052261 A1* | 3/2007 | Andre et al. | 296/193.04 |
| 2008/0122265 A1* | 5/2008 | Meier | 296/204 |
| 2010/0072788 A1* | 3/2010 | Tyan et al. | 296/205 |
| 2010/0244497 A1* | 9/2010 | Honda et al. | 296/205 |
| 2010/0327631 A1* | 12/2010 | Brunner | 296/205 |

FOREIGN PATENT DOCUMENTS

| | | |
|---|---|---|
| DE | 4120844 C1 | 11/1992 |
| EP | 0631924 A1 | 1/1995 |
| EP | 1508508 A1 | 2/2005 |
| EP | 2025581 A1 | 2/2009 |
| JP | 02164675 A * | 6/1990 |
| JP | 05319302 A * | 12/1993 |
| JP | 06227427 A * | 8/1994 |
| WO | WO-03/013941 A1 | 2/2003 |
| WO | WO-2005/061311 A1 | 7/2005 |

* cited by examiner

COMPOSITE BAR FOR THE CHASSIS OF A VEHICLE

PRIORITY CLAIM

This application claims the benefit of priority under 35 U.S.C. Section 119 to Italian Patent Application Serial No. B02010A 000024, filed on Jan. 18, 2010, which is incorporated herein by reference in its entirety.

TECHNICAL FIELD

The present subject matter relates to a composite bar for the chassis of a vehicle, and more particularly to a car chassis made by joining a plurality of extruded elements, to which explicit reference will be made in the following description without loss of generality.

BACKGROUND

As described in patent application WO2005061311A1, for example, a car chassis made by joining a plurality of extruded element comprises a plurality of linear bars, which have a constant section, are made by extrusion, and are joined to one another by welding at structural nodes defined by junction bodies provided with pockets for accommodating the head of the linear bars.

Some linear bars may not be monolithic but must imperatively be composite (i.e. made of several parts) and removable (i.e. the parts are connectable and disconnectable from one another) to allow some particularly large parts of the car (typically, but not only, the thermal engine and the gearbox) to be assembled and disassembled. A composite bar is made by joining several extruded elements which are butt jointed to one another. Currently, the butt jointing of the two extruded elements includes using junction bodies which rest on the two extruded elements and are fixed (typically by means of screws) to both extruded elements; several junction bodies with flat cross section or junction bodies with a with an either "L"-shaped or "U"-shaped cross section are required to confer an adequate stiffness to the butt joint. However, using the junction bodies implies both an increase of the overall weight of the chassis (the weight of the junction bodies is "wasted" because the only function of the junction bodies is to make some parts removable) and an increase of dimensions (the junction bodies locally increase the size of the linear bar).

DE3811427A1 and EP0631924A1 describe a composite bar for the chassis of a vehicle which consists of two extruded elements which are butt jointed together at a junction area. Each extruded element has a trapezoidal cross section having a major base, a minor base parallel and opposite to the major base and two side walls; furthermore, one end of an extruded element arranged in the junction area has no major base. In the composite bar described in DE3811427A1 and EP0631924A1, the end of an extruded element has a deformation so that the cross section of the end of the extruded element may be axially inserted without interference into one end of the other extruded element. However, the need to locally deform the end of an extruded elements implies a further mechanical machining which complicates the machining of the extruded elements and may locally reduce the mechanical strength at the deformation itself.

SUMMARY

Some examples provide a composite bar for the chassis of a vehicle, which composite bar is free from the drawbacks described above and, in particular, is easy and cost-effective to be manufactured.

Examples of a composite bar for the chassis of a vehicle are provided as claimed in the attached claims.

BRIEF DESCRIPTION OF THE DRAWINGS

The present invention will now be described with reference to the accompanying drawings, which illustrate a non-limitative embodiment thereof, in which.

DETAILED DESCRIPTION

Figure 1:
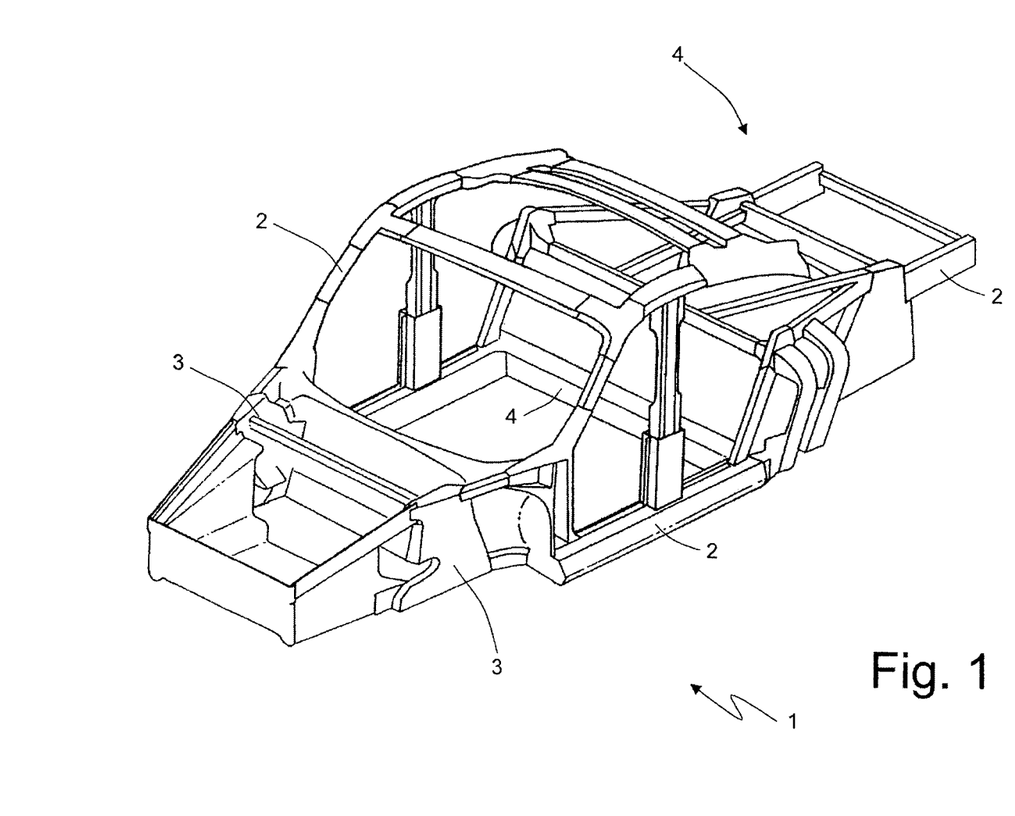
FIG. 1 is a diagrammatic, perspective view of a chassis of a vehicle provided with a composite bar made in accordance with some examples.

In FIG. 1, numeral 1 indicates as a whole a chassis of a car, which comprises a number of linear bars 2, which have a constant section, are made by extrusion, and are joined together by welding at structural nodes defined by junction bodies 3 (further details on the shape of the junction bodies 3 are described in patent application WO2005b061311A1, which is incorporated herein by reference in its entirety).

A linear bar 4 is composite and removable (i.e. may be split into several parts which are connectable and disconnectable) to allow some particularly large parts of the car (typically, but not only, the thermal engine and the gearbox which are centrally arranged in chassis 1) to be assembled and disassembled.

Figure 2:
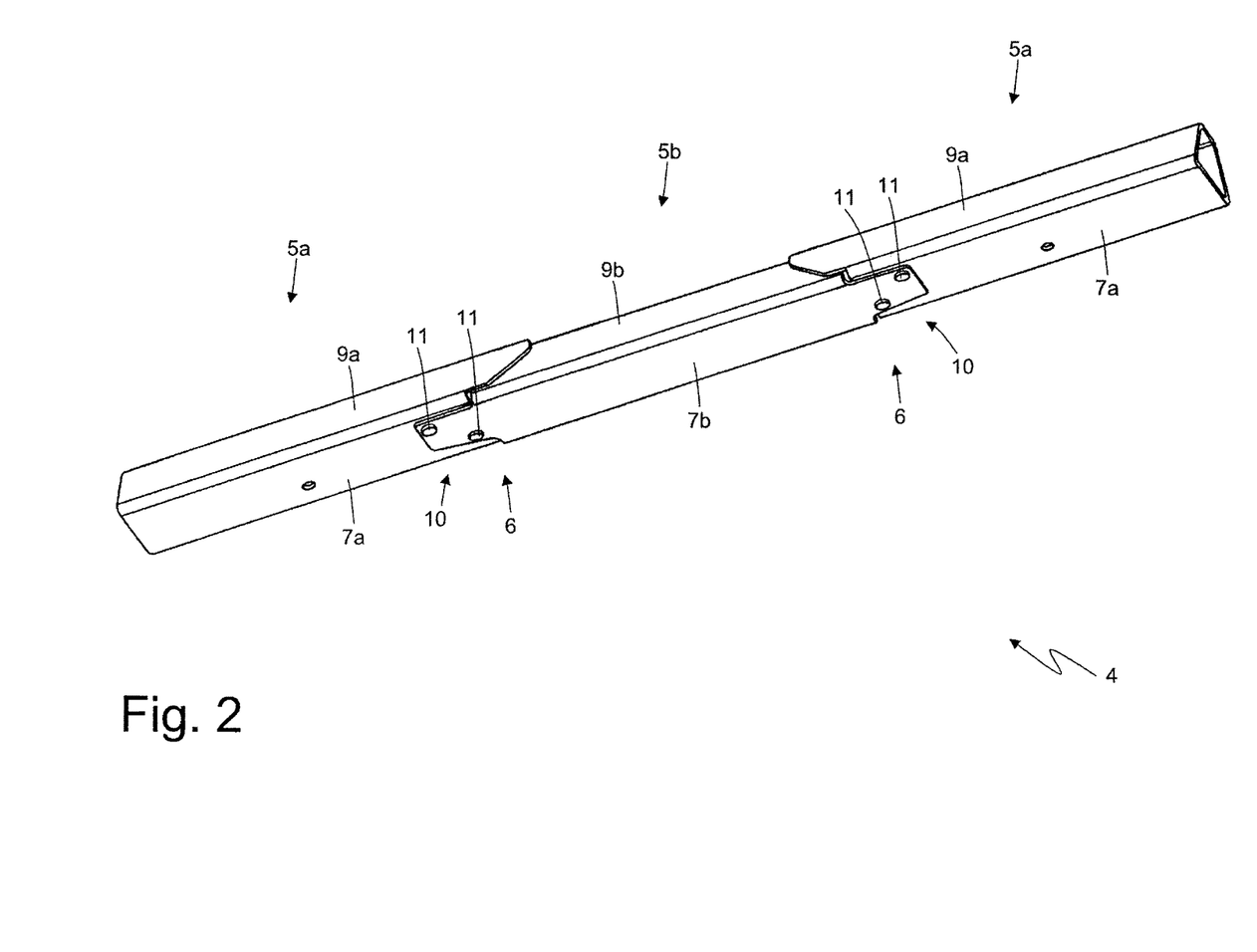
FIG. 2 is a perspective view of the composite bar which consists of several extruded elements butt jointed together.
Figure 3:
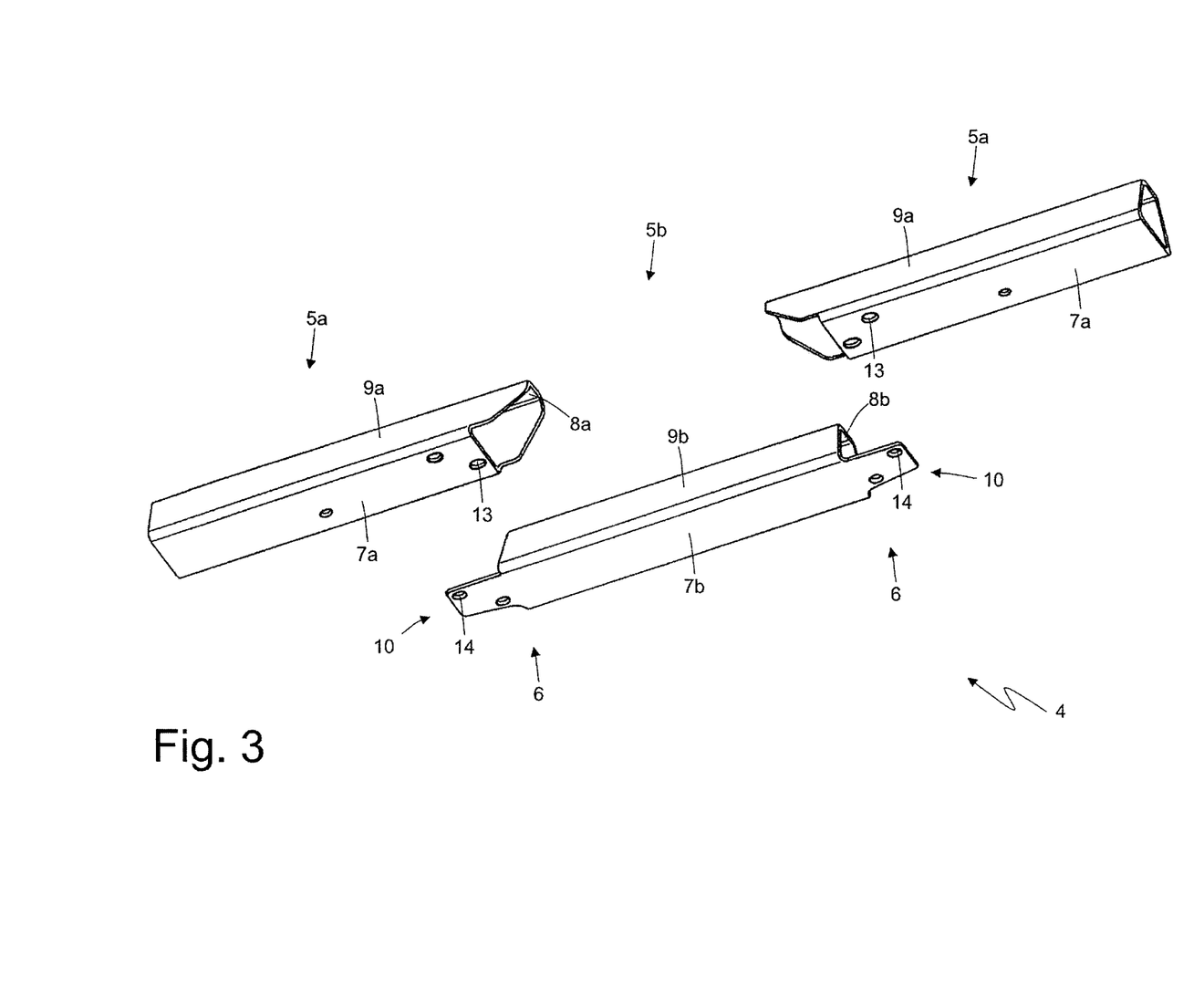
FIG. 3 is an exploded, perspective view of the composite bar in FIG. 2.

As shown in FIGS. 2 and 3, composite bar 4 consists of two lateral extruded elements 5a and of a central extruded element 5b, which is arranged between the two lateral extruded elements 5a and is butt jointed to the two lateral extruded elements 5a at two distinct junction areas 6.

Figure 5:
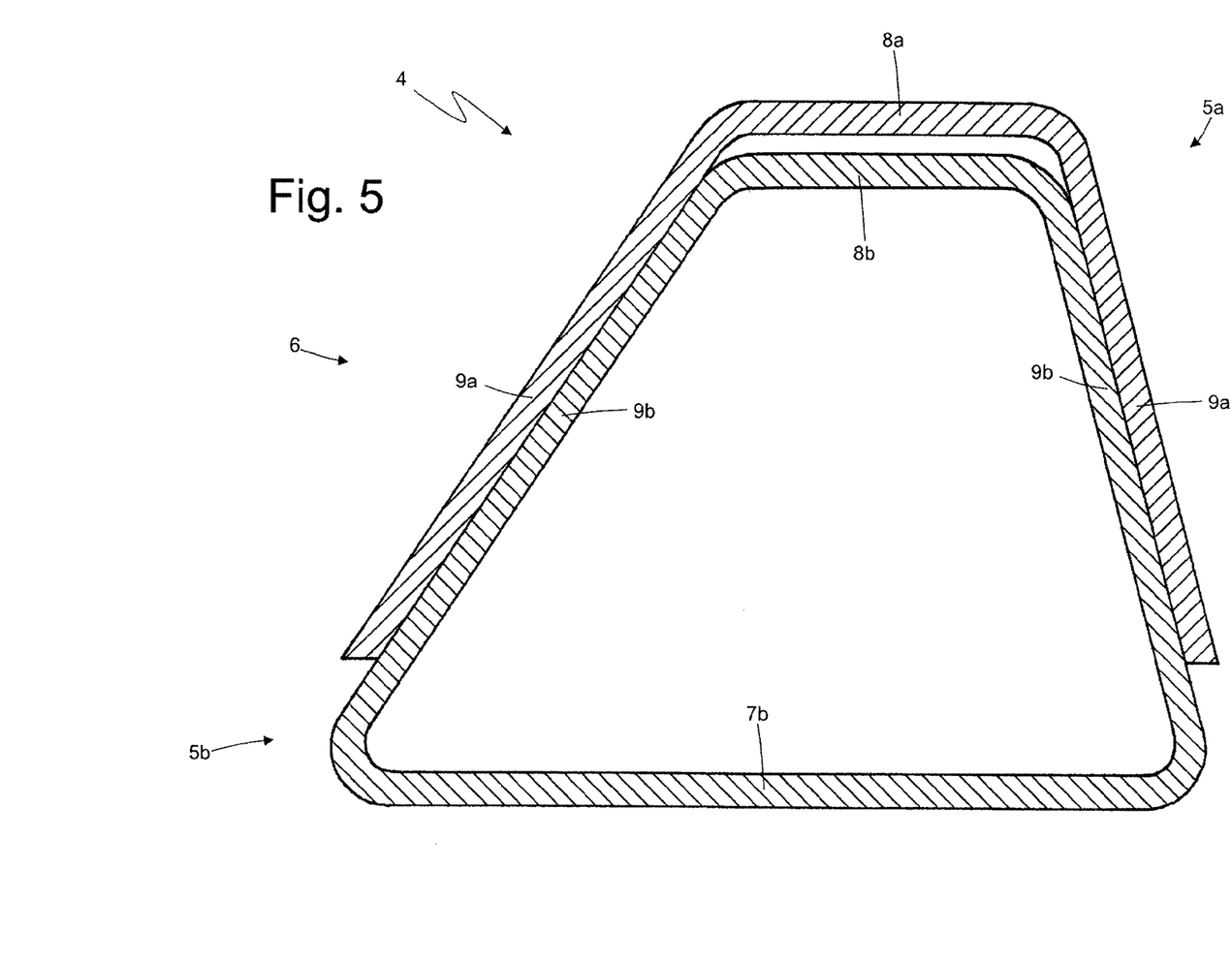
FIG. 5 is a cross section view taken along line V-V of the composite bar in FIG. 2.
Figure 7:
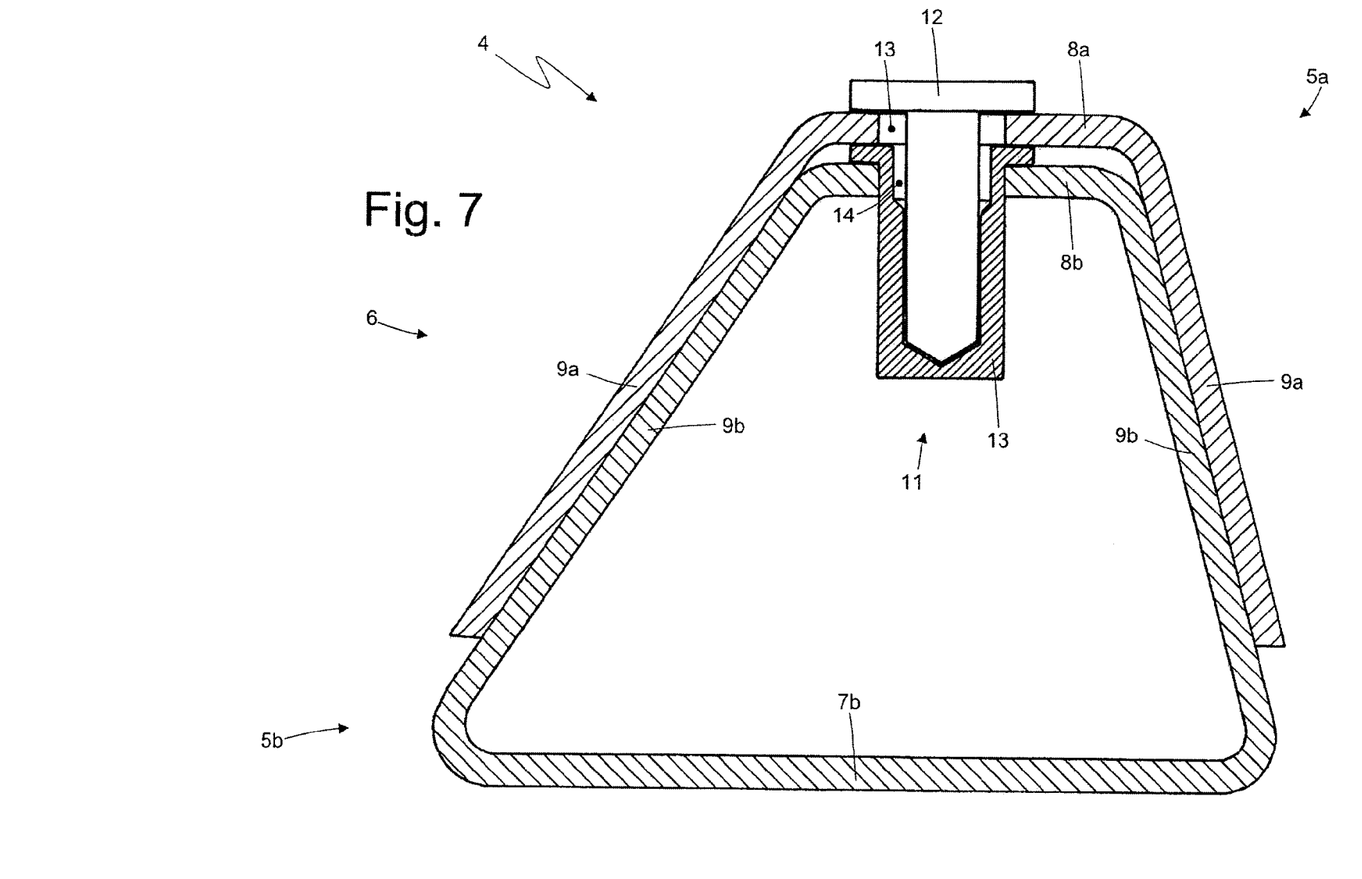
FIG. 7 is a cross section view taken along line VII-VII of the composite bar in FIG. 2.

As shown in FIGS. 5 and 7, each extruded element is internally hollow and has a trapezoidal cross section having a major base 7, a minor base 8 parallel and opposite to the major base 7, and two side walls 9. It is worth noting that the extruded elements 5 have exactly the same cross section, i.e. their cross sections have exactly the same shape and the same size; the extruded elements 5 thus have the same mechanical performances and are produced in the same extrusion template (die) (the differences between the extruded elements 5 are made upon the extrusion through mechanical removal machining).

As shown in FIGS. 3, 4, 5 and 7, one end of each extruded element 5a arranged in the corresponding junction area 6 has no major base 7a; thereby, a corresponding end of the extruded element 5b arranged in the junction area 6 is interference fitted according to a direction perpendicular to the bases 7 and 8 of the two extruded elements 5 into the end of the extruded element 5a through the missing major base 7a. Therefore, at each junction area 6, the minor base 8a of the corresponding extruded element 5a is arranged parallel to and facing the minor base 8b of the extruded element 5a, and the side walls 9a of the extruded element 5a are arranged parallel to and facing the corresponding side walls 9b of the extruded element 5b. In other words, at each junction area 6, one end of the extruded element 5b is interference fitted into one end of the extruded element 5a through the missing major base 7, so that an outer surface of each side wall 9b of the extruded element 5b is arranged in contact with an inner surface of a corresponding side wall 9a of the extruded element 5a.

As previously mentioned, the extruded elements 5 have exactly the same cross section and therefore, at each junction area 6, the minor base 8a of the corresponding extruded element 5a is never able to come in contact with the minor base 8b of the extruded element 5b due to an apparent mechanical interference which limits the approach between the two minor bases 8. Therefore, at each junction area 6, a mechanical interference fitting of the extruded element 5b into the extruded element 5a is obtained; as previously mentioned, at each junction area 6, the insertion of the extruded element 5b into the extruded element 5a is possible because the extruded element 5a has no major base 7a at the junction area 6.

It is worth noting that the two extruded elements 5 have exactly the same trapezoidal cross section, which is strictly constant along the whole extension of each extruded element 5, even at the junction area 6; i.e. the trapezoidal cross section of both extruded elements 5 is not subject to any variation even in the junction area 6.

According to an embodiment shown in FIGS. 2, 3, 4, 6 and 8, each end of the extruded element 5b comprises an appendix 10, which forms a seamless extension of the major base 7b and rests on the major base 7a of the corresponding extruded element 5a.

Fastening members 11 which block the two extruded elements 5 against each other are provided in each junction area 6. In the embodiments shown in the accompanying figures, the fastening members 11 are removable, i.e. do not define a permanent connection but may be removed (to allow the separation of the extruded elements 5) and then restored (to allow the re-composition of the composite bar 4). According to a different embodiment, the fastening members 11 are permanent (e.g. rivets or welding) when the removability of the composite bar 4 is not required.

The fastening members 11 interact only with the bases 7 and 8 of the two extruded elements 5 to push each base 7 and 8 of the extruded element 5a towards the corresponding base 7 and 8 of the extruded element 5b. In other words, the action generated by the fastening members 11 is applied only along a direction perpendicular to the bases 7 and 8 of the two extruded elements 5.

Figure 8:
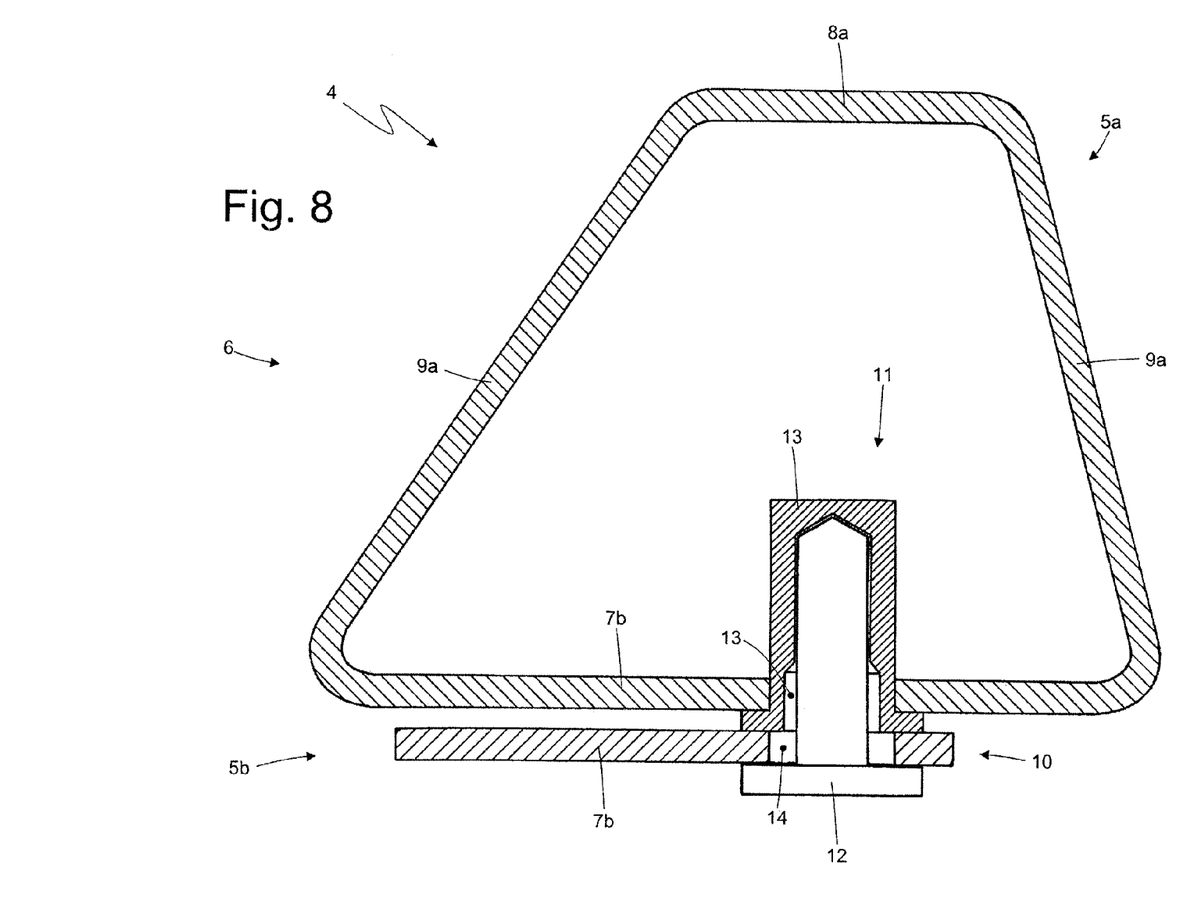
FIG. 8 is a cross section view taken along line VIII-VIII of the composite bar in FIG. 2.

As shown in FIGS. 7 and 8, each fastening member 11 consists of a screw 12 which is inserted through a through hole 13 obtained through the extruded element 5a and through a through hole 14 obtained through the extruded element 5b. In each fastening member 11, either the hole 13 obtained through the extruded element 5a or the hole 14 obtained thorough the extruded element 5b is covered with a threaded bushing 15, which is fixed (typically welded) to the extruded element 5 and centrally has a threaded hole, which is engaged by screw 12. The function of the threaded bushings 15 is to increase the fastening ability of the fastening members 11 because the thickness of the extruded elements 5 is relatively small and thus does not allow to obtain a threading of adequate axial size.

Figure 4:
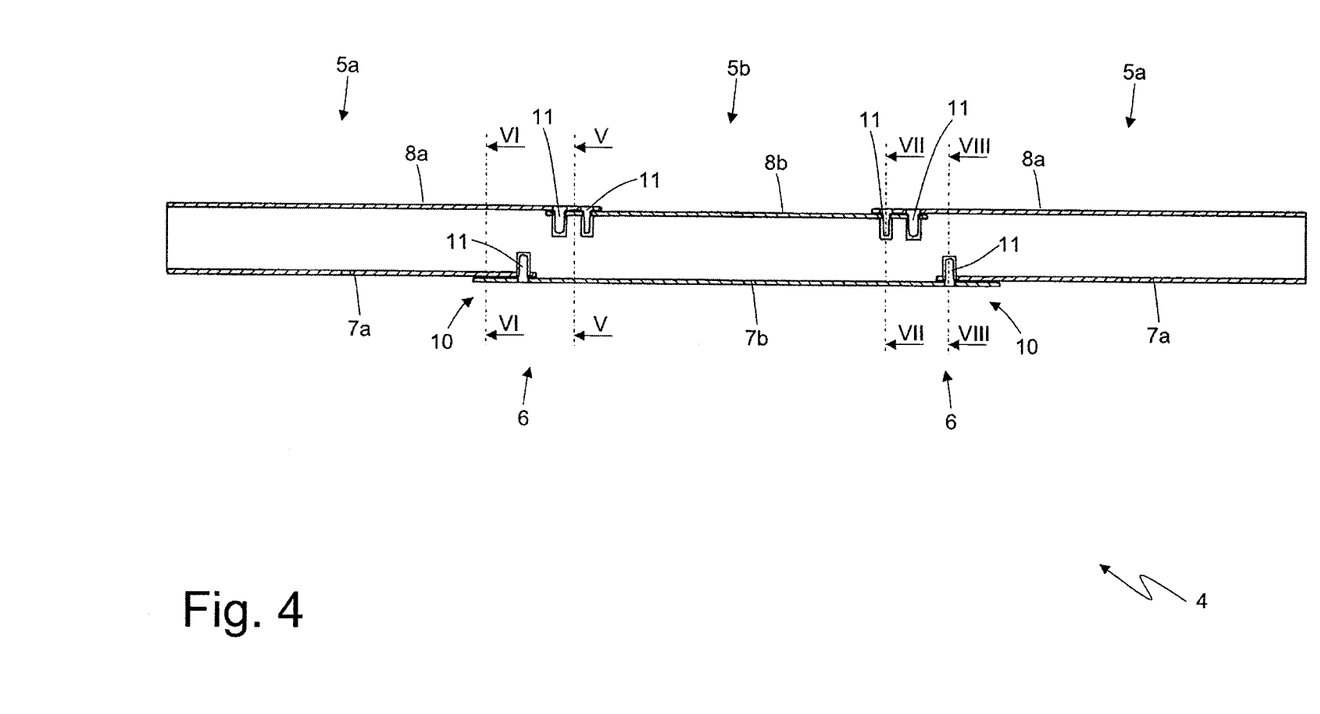
FIG. 4 is a longitudinal section of the composite bar in FIG. 2.

As shown in FIG. 4, the fastening members 11 are arranged only through the bases 7 and 8 of the extruded elements 5 and, at each junction area 6, serve the function of pulling together the corresponding extruded elements 5. In particular, the fastening members 11 are arranged through the minor bases 8 of the extruded elements 5 and are arranged through the major bases 7a of the extruded elements 5a and through the appendixes 10 of the extruded element 5b which form an extension of the major base 7b of the extruded element 5b.

According to a different embodiment (not shown), the appendixes 10 of major base 7b of the extruded element 5b are not present (and therefore the fastening members 11 which concern the appendixes 10 are not present).

Figure 6:
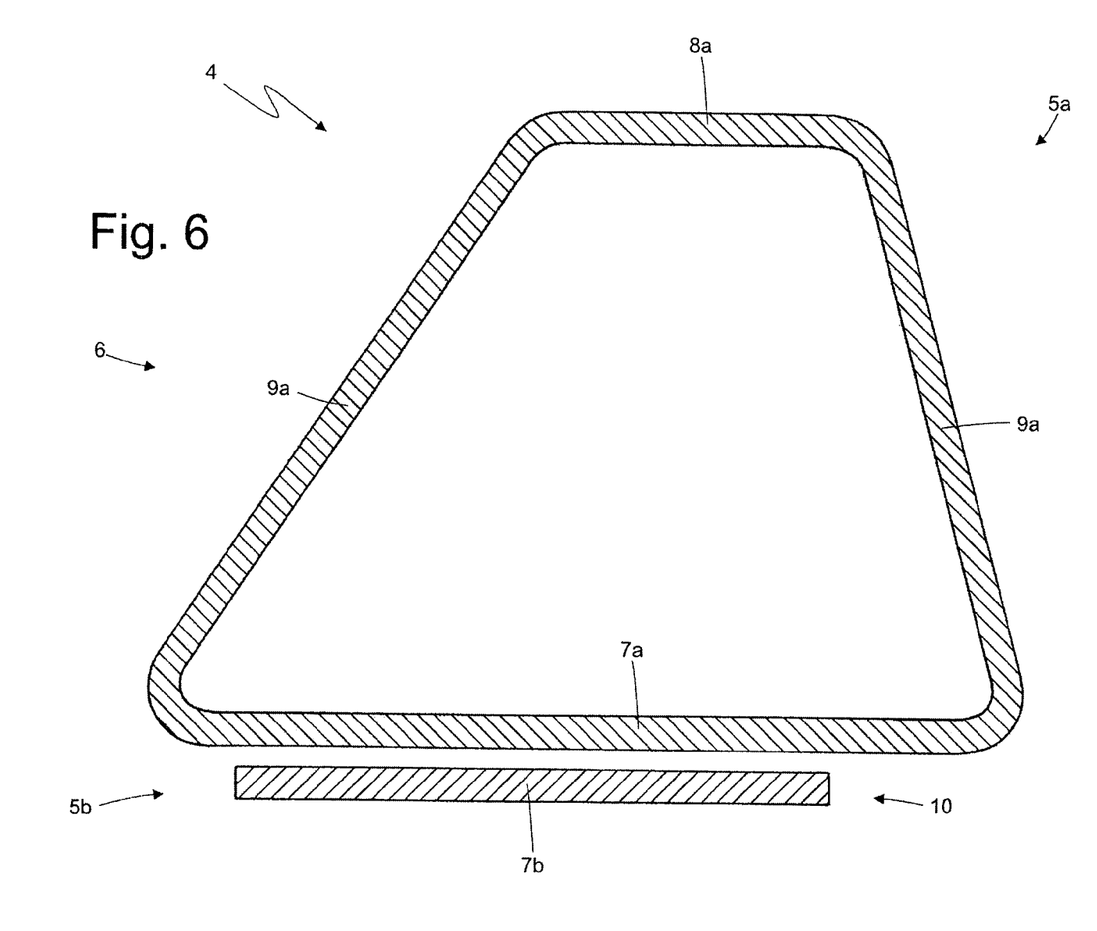
FIG. 6 is a cross section view taken along line VI-VI of the composite bar in FIG. 2.

At each junction area 6, a contact occurs between the minor base 8a of the extruded element 5a and the minor base 8b of the extruded element 5b (as shown in FIGS. 5 and 7), a contact occurs between the major base 7a of the extruded element 5a and the major base 7b of the extruded element 5b, which major base 7b is extended by appendix 10 (as shown in FIGS. 6 and 8), and a contact occurs between the side walls 9a of the extruded element 5a and the side walls 9b of the extruded element 5b (as shown in FIGS. 5 and 7). It is worth specifying that, in each junction area 6, the bases 7 and 8 of the two extruded elements 5 transmit stresses to each other due to the presence of fastening members 11, while the side walls 9 of the two extruded elements 5 transmit stresses to each other by means of the mechanical interference fitting which exists between the side walls 9 themselves. Due to the presence of four distinct contact areas in each junction area 6, the butt joint between two extruded elements 5 is particularly tough and strong and substantially has the same mechanical strength as a similar monolithic bar (i.e. without junctions).

The above-described composite bar 4 has many advantages, as it has a high mechanical strength (substantially equal to a similar monolithic bar) while having very small additional parts for the junctions (e.g. appendixes 10 of the major base 7b of the extruded element 5b), thus of minimum weight and size.

What is claimed is:

1. A composite bar for a chassis of a vehicle, the composite bar comprising at least first and second extruded elements which are hollow inside and which are butt jointed together at a junction area, with each of the first and second extruded elements comprising a trapezoidal cross section comprising a major base, a minor base parallel and opposite to the major base, and two side walls, with a first end of a first extruded element arranged in the junction area defining a major base opening;
   wherein the first and second extruded elements have a same trapezoidal cross section; and
   wherein a second end of a second extruded element is arranged in a junction area interference fitted, along a direction perpendicular to the bases of the first and second extruded elements, inside the first end through the major base opening, with an outer surface of each side wall of the second extruded element in contact with a first inner surface of a corresponding side wall of the first extruded element.

2. A composite bar according to claim 1, wherein the second end of the second extruded element comprises an appendix that forms an extension of the major base and rests on the major base of the first extruded element.

3. A composite bar according to claim 1 and comprising fastening members that are arranged in the junction area and block the first and second extruded elements against each other, wherein the fastening members interact with the bases, of the first and second extruded elements to push at least one base of the first extruded element towards a corresponding base of the second extruded element.

4. A composite bar according to claim 3, wherein action generated by the fastening members is applied along a direction perpendicular to the bases of the first and second extruded elements.

5. A composite bar according to claim 1 and comprising fastening members that are arranged in the junction area and block the first and second extruded elements against each other, wherein for each fastening member, the first through hole or the second through hole is covered with a threaded bushing which is fixed either to the first extruded element or to the second extruded element, respectively.

6. A composite bar according to claim 1 and comprising fastening members that are arranged in the junction area and block the first and second extruded elements against each other, wherein the fastening members are arranged through the bases, of the first and second extruded elements and are adapted to pull together the extruded elements themselves.

7. A composite bar according to claim 6, wherein at least one fastening member is arranged through the minor bases of the first and second extruded elements.

8. A composite bar according to claim 6, wherein the second end of the second extruded element comprises an appendix that forms an extension of the major base and rests on the major base of the first extruded element and at least one fastening member is arranged through the wall of the major base of the first extruded element and through the appendix of the second extruded element.

9. A composite bar according to claim 1, wherein the second extruded element is a central extruded element and the first extruded element is one of two first lateral extruded elements arranged on opposite sides of the central extruded element, each of which is butt jointed to the central extruded element at two respective junction areas.

10. A vehicle, comprising:
a chassis comprising a composite bar, the composite bar comprising:
a first extruded element that is hollow, comprising a first trapezoidal cross section comprising a first major base, a first minor base parallel and opposite the first major base, and two first side walls, the first extruded element at a first end defining a major base opening opposite the first minor base; and
a second extruded element that is hollow, comprising a second trapezoidal cross section comprising a second major base, a second minor base parallel and opposite the second major base, and two second side walls, wherein the second extruded element is butt jointed to the first extruded element at a junction area, with a second end of the second extruded element being interference fit, in a direction perpendicular to the bases, inside the first end, through the major base opening of the first extruded element, with the second trapezoidal cross section substantially coextensive with the first trapezoidal cross section, and with an outer surface of each second side wall of the second extruded element arranged in contact with a first inner surface of a corresponding first side wall of the first extruded element.

11. A composite bar according to claim 10, wherein the second end of the second extruded element comprises an appendix that forms an extension of the major base and rests on the major base of the first extruded element.

12. A composite bar according to claim 10 and comprising fastening members that are arranged in the junction area and block the first and second extruded elements against each other.

13. A composite bar according to claim 12, wherein the fastening members are adapted to interact with the bases of the first and second extruded elements to push at least one base of the first extruded element towards a corresponding base of the second extruded element.

14. A composite bar according to claim 13, wherein the fastening members are adapted to push along a direction perpendicular to the bases of the first and second extruded elements.

15. A composite bar according to claim 12, wherein each fastening member comprises a screw, which is inserted through a first through hole obtained through the first extruded element, and a second through hole obtained through the second extruded element.

16. A composite bar according to claim 15, wherein for each fastening member, the first through hole or the second through hole is covered with a threaded bushing which is fixed either to the first extruded element or to the second extruded element.

17. A composite bar according to claim 12, wherein the fastening members are arranged through the bases, of the first and second extruded elements and are adapted to pull together the extruded elements.

18. A composite bar according to claim 17, wherein at least one fastening member is arranged through the minor bases of the first and second extruded elements.

19. A composite bar according to claim 17, wherein the second end of the second extruded element comprises an appendix that forms an extension of the major base and rests on the major base of the first extruded element and at least one fastening member is arranged through the wall of the major base of the first extruded element and through the appendix of the second extruded element.

20. A composite bar according to claim 12, wherein the second extruded element is a central extruded element and the first extruded element is one of two first lateral extruded elements arranged on opposite sides of the central extruded element, each of which is butt jointed to the central extruded element at two respective junction areas.

* * * * *